United States Patent [19]
Jones, Jr. et al.

[11] Patent Number: 4,663,675
[45] Date of Patent: May 5, 1987

[54] APPARATUS AND METHOD FOR DIGITAL SPEECH FILING AND RETRIEVAL

[75] Inventors: Gardner D. Jones, Jr.; Larry D. Larsen, both of Raleigh, N.C.

[73] Assignee: International Business Machines Corporation, Armonk, N.Y.

[21] Appl. No.: 607,028

[22] Filed: May 4, 1984

[51] Int. Cl.⁴ .......................... G11B 5/09; H04M 11/00
[52] U.S. Cl. .......................................... 360/32; 369/32; 379/77
[58] Field of Search ................ 360/32; 179/6.01, 2 A, 179/6.07, 6.08, 6.1, 6.11, 6.14, 2 DP; 369/24, 32; 381/29–35

[56] References Cited

U.S. PATENT DOCUMENTS

| | | | |
|---|---|---|---|
| 3,436,483 | 4/1969 | Blane | 179/6.09 |
| 3,524,026 | 8/1970 | Langendorf et al. | 179/6.11 X |
| 3,715,518 | 2/1973 | Campbell et al. | 179/6.11 X |
| 3,864,519 | 2/1975 | Owen | 179/6.14 X |
| 3,864,520 | 2/1975 | Owen | 179/6.14 X |
| 3,989,901 | 11/1976 | Neuwirth et al. | 179/6.14 |
| 4,004,276 | 1/1977 | Robinson et al. | 179/6.11 X |
| 4,024,348 | 5/1977 | Simizu | 179/6.11 |
| 4,122,306 | 10/1978 | Friedman et al. | 179/6.07 X |
| 4,191,855 | 3/1980 | Sakai | 179/2 DP X |
| 4,288,823 | 9/1981 | Yamamoto et al. | 360/73 |
| 4,339,818 | 7/1982 | Gruenberg | 381/31 X |
| 4,400,586 | 8/1983 | Hanscom | 179/6.07 X |
| 4,435,831 | 3/1984 | Moyer | 381/30 |
| 4,521,647 | 6/1985 | Olson et al. | 179/6.11 X |

Primary Examiner—Raymond F. Cardillo
Assistant Examiner—Alyssa H. Bowler
Attorney, Agent, or Firm—Edward H. Duffield

[57] ABSTRACT

An improved method and apparatus of digital speech storage and retrieval is described utilizing silence gaps for insertion of control signal information. This prevents interference with incoming control signals by feedback of signals through the hybrid circuit that occurs during playback of the stored speech. A diverter switch is controlled during the playback mode to allow incoming control signals to be decoded only when gaps of sufficient length are detected in the played back program.

7 Claims, 5 Drawing Figures

APPARATUS AND METHOD FOR DIGITAL SPEECH FILING AND RETRIEVAL

FIELD OF THE INVENTION

This invention relates to digital and analog communication systems in general and specifically to the digital storage of analog voice signals in a telephone system for filing, retrieval and/or distribution at a later time.

BACKGROUND OF THE INVENTION

Numerous applications requiring storage and later retrieval of digitized speech signals exist. Audio response units which store prerecorded messages or vocabularies of instruction words and/or speech filing systems that record digitized versions of on-line analog speech messages for storage and later retrieval for a telephone answering application exist. With increasing emphasis placed upon office communications for the future, speech digitization and filing for later retrieval under computer control is an increasingly important application for this technology.

Typical prior art speech filing systems take analog speech signals from a telephone line, convert them to a low rate digital code and store the results in a digital storage medium such as a magnetic disk. Parallel analog tone control of the system is usually provided using a conventional telephone tone signaling key pad. To conserve memory space, low rate speech coding techniques, of which several are available, are employed. Disk storage requirements are further reduced by removing the silence gaps inherent in most speech input signals prior to the storage of the actual signals received. The gap information is traditionally retained in a run length encoding technique which is stored, in multiplexed fashion, with the digital information of the coded speech signal on the storage medium. During playback, the gaps are reinserted in the speech message stream to achieve a natural sound for the listener.

A problem with the known prior art is that a conventional hybrid circuit converts the two-wire telephone line to the four-wire speech encoder and decoder interface. This places severe demands and conflicting requirements upon the parallel tone receiver employed. During speech input, the receiver input will consist both of the remote control signals in the form of parallel encoded tones to which the receiver must react and to the analog speech input signals which must be recorded and to which it should not react. The receiver has to have a good "talk off" protection circuit so that the receiver will not falsely interpret portions of the speech signal spectrum as control tone pairs. Most competitive high performance parallel tone receivers have this facility. However, during playback of the stored speech, inputs to a parallel tone receiver would ideally be only the remote control parallel tone signals if the hybrid circuit were a perfect one.

Unfortunately, no perfect hybrid circuits exist and there is a significant loss or leakage between the legs of the hybrid circuit as will be readily understood by those of skill in the art. Typically, the losses from the transmit to the receive leg are in the range of 15db. Given a playback transmit level of 0dbm, a leakage signal will be present at the input leg of the hybrid circuit of −15dbm or more. Typical input signal levels from the analog telephone line are in the range of −25dbm. Therefore, during playback mode, incoming control signals at −25dbm will simply be swamped by the −15dbm leakage signal from the playback of previously recorded messages being sent out through the hybrid circuit. The normal "talk off" circuitry of the receiver will completely prevent the control signals from being received during this phase of operation. The only opportunity for response would be during the inserted gap periods when the playback signal level is near 0. When the gap is long enough, the receiver could respond to control signals but the automatic gain control circuit normally incorporated does not allow a fast recovery and the receiver will not respond to control signals during the gap time for short gaps.

Thus, for the duration of playback, the user at the remote end will be unable to signal control information to the system from his end of the line. The problem is real and has been demonstrated in existing equipment.

OBJECTS OF THE INVENTION

In view of the foregoing known difficulties wth the prior art, it is an object of this invention to provide an improved apparatus and technique for speech filing systems in which parallel tone control signals are permitted entry to the system during gaps of sufficient duration. The automatic gain level control circuitry is driven to a quiescent point at low signal levels so that a rapid response to incoming control signals can be achieved when such signals are finally permitted to pass to the receiver.

It is another object of the present invention to prevent possible false control activation in an improved speech filing system during the playback mode.

SUMMARY

The foregoing and still other objects of the invention which have not been enumerated are met in the present invention by providing a control technique and apparatus for the speech filing system which disconnects the parallel tone receiver from the reception path of the hybrid circuit during the active playback of previously recorded material. This prevents the large amplitude speech signal leakage through the hybrid circuit from entering into the receiver and eliminates any possible false control activation due to this signal. Importantly, this disconnection allows the automatic level control circuit of the automatic gain control in the receiver to be at its quiescent or lowest signal level point for rapid response once an incoming signal is supplied. The receiver will be connected to signals coming from the receive path of the hybrid circuit during normal record/control modes and during silence gaps of sufficient length in the playback mode. The silence gaps are normally digitally encoded as to length and stored with the encoded speech signals. These gaps may be detected on read back and when a gap length is detected having sufficient duration to allow a parallel tone receiver to respond for any potential control signals from a remote user, the switch interrupting the reception path from the hybrid circuit may be again closed.

DETAILED SPECIFICATION

Numerous examples of systems that require the digitization and storage of speech signals under control of a computer system for later retrieval are known. Examples are audio response units such as the IBM Series/1 Telephone Communication feature which stores a prerecorded vocabulary of instructions or application data for later retrieval. Office systems such as those necessary for the filing and/or distribution of speech messages of recorded on-line conversation for use in telephone answering systems are also examples. The speech filing and retrieval and/or distribution function is an important one for future professional office communications systems.

Figure 1A:
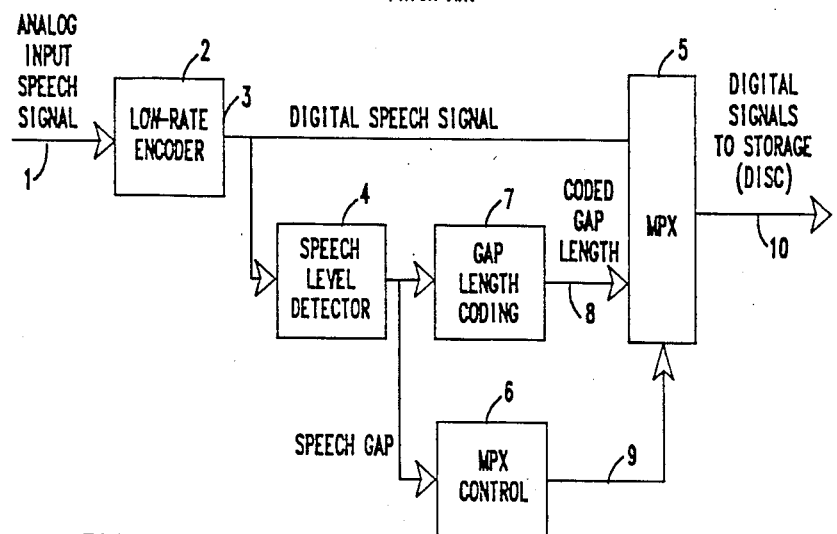
FIG. 1A illustrates a generic prior art digital speech storage system employing speech gap and run length detection and encoding.
Figure 1B:
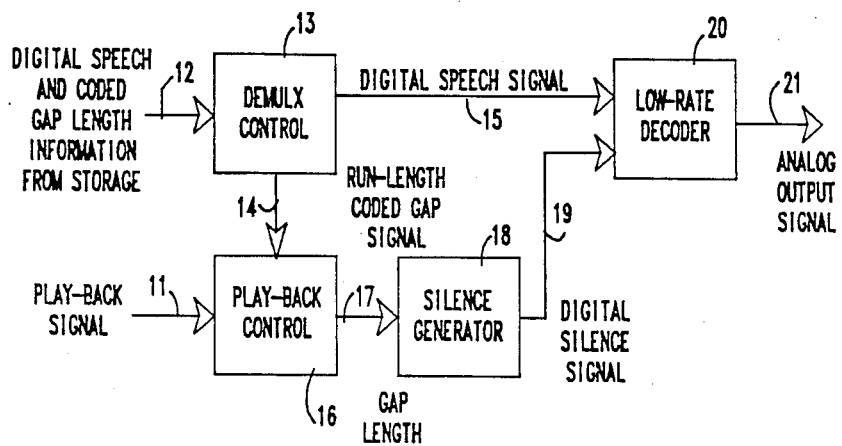
FIG. 1B illustrates a generic prior art digital speech retrieval and playback system for regenerating analog speech output signals with appropriate silences or gaps interspaced in accordance with the run length encoded gap signals from the digital storage medium.

A typical prior art generic speech filing system is shown in FIGS. 1A and 1B. In FIG. 1A, analog speech input signals are taken from the telephone line 1, converted to a low rate digital code in the encoder 2, and stored on a digital storage medium such as a magnetic disk as digital signals emanating on line 10. Control of the system is accomplished through typical parallel tone signaling provided by conventional telephone tone key pads. Control commands consist of remotely entered identification numbers, file numbers, playback instructions and the like to the filing system.

In order to conserve memory space, a low rate speech coding technique such as sub band coding, adaptive transform coding, or linear predictive encoding is used to bring the active coding rate down from the 64 kilobit per second typical telephone analog signaling rate for digital data and digitized voice to a 16 kilobit per second compacted coding rate. Disk storage can be reduced still further by removing the prevalent silence gaps from the speech signal input prior to storage of the information. The gap information may be retained in a run length encoded gap duration signal. This may be multiplexed with the digitally coded speech signals for recording on the magnetic medium. In FIG. 1A, the encoded digital input signals appear on line 3 and are directed to the speech level detector 4. Levels below a determinable threshold are identified as silence and drive a gap length coding circuit 7 to provide gap length encoded information on line 8 to a multiplexer 5. Detection of the speech gap drives the multiplexer control 6 to provide an output on line 9 to the multiplexer 5 for inserting the gap run length coded information from the encoder 7 onto the medium during the portions of time in which the speech signal is quiescent.

FIG. 1B illustrates the operation of a system for playback. During playback, digital speech and encoded gap length information from the storage is applied on line 12 to a demultiplexing control 13. This separates the run length encoded gap signal information on line 14 from the output digital speech signal on line 15. A playback control signal coming from a parallel tone code detector, not shown, is applied on line 11 to the playback control 16. During the playback mode, playback control 16 is activated and the run length encoded gap signals on line 14 are used to generate a gap length signal to drive a silence generator 18. The silence generator produces either silence or low level random noise for naturalness and applies this in the form of a digitized signal on line 19 to a low rate decoder 20. A resultant analog output signal appears on line 21 at the output of the low rate decoder 20. The analog output signal on line 21 consists of reconstituted analog speech with appropriately inserted gaps of "silence" or the equilavent in low level random noise for naturalness.

One frequently provided feature is that which permits the user listening at the remote end of the telephone line to control the length of the gaps by a parallel tone control signal. The remote user can elect to have the gaps inserted in full duration or in some proportionally reduced duration for faster playback. One half, one quarter or one eighth of the original gap values or the removal of gaps completely can be selected in a typical system. In reality, gaps having a minimum duration of about 20 milliseconds will exist because of practical design considerations in the speech level detector circuit that must be employed to avoid ambiguity in presence or absence of speech.

Figure 2A:
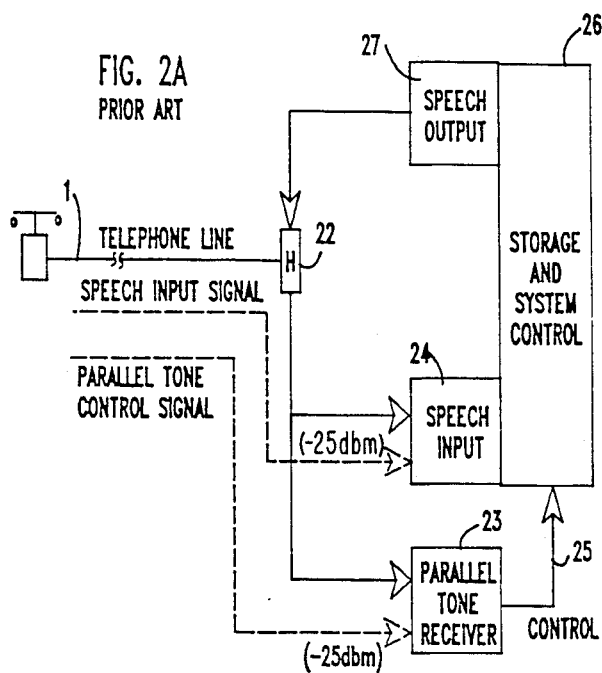
FIG. 2A illustrates a typical prior art digital speech filing system during the input or storage mode.
Figure 2B:
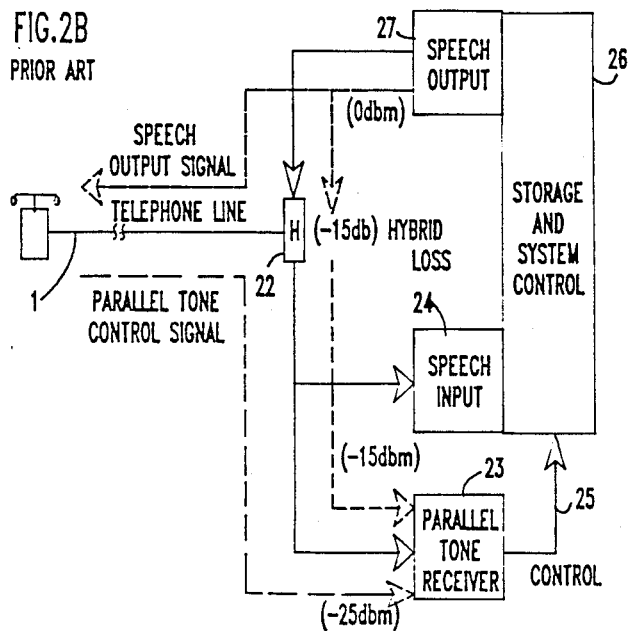
FIG. 2B illustrates a typical prior art digital speech storage system operating during the playback and control mode.

FIGS. 2A and 2B illustrate a typical prior art digitized speech filing system in its input and control mode and in the playback and control modes, respectively. Incoming analog signals on line 1 in FIG. 2A are applied to a typical hybrid circuit 22, to interface the 4-wire speech encoder and decoder interfaces from the conventional 2-wire telephone line. The hybrid circuit 22 directs its output on the analog receive side to the speech input circuit 24 and to the parallel tone receiver circuit 23. The parallel tone receiver receives control tones and supplies control signals to the system control and storage generically shown in block 26. The speech input circuits 24 will incorporate the usual low rate encoder 2 and the multiplexer 5 as shown in FIG. 1A. The speech output circuit 27 takes outputs during playback and supplies them in reconstructed analog form to the hybrid circuit 22 for output on the telephone line 1.

The dashed lines in FIG. 2A illustrate the path of a speech input signal having a relative signal level of −25dbm which is the typical receive level over switched telephone lines. The parallel tone control signal also is shown as having a similar signal level. The parallel tone receiver 23 is subjected to a very demanding and conflicting set of requirements as will be apparent from the following discussion.

During speech input, the input to the system will consist of both the remote control signals to which the system must react and to the input speech signals which are being recorded to which the control system should not react. A talk off protection circuit is typically included in the parallel tone receiver 23 to prevent the receiver from falsely interpreting portions of the speech spectrum as control tone pairs. As shown in FIG. 2A, both the remote speech and control signals arrive at the filing system interface with a level of about −25dbm.

The problem occurs primarily during playback. During the playback period, the input to the parallel tone receiver would ideally consist only of remotely generated and received remote control signals if the hybrid circuit 22 were a perfect one. The problem exists because practical hybrid circuits are not perfect and the loss from the transmit to the receive leg will not be infinite but will be typically about 15db. Worst case losses of 10db are not uncommon. The typical transmit level at the output side of the circuit is usually 0dbm and this means that during playback mode, a signal produced by leakage through the hybrid circuit 22 and having a level of approximately −15dbm to as much as −10dbm will exist at the input to the parallel tone receiver 23. This places a great burden on the talk off circuit performance requirements in the receiver.

Most critically, when control signals are transmitted to the receiver during the cause of playback, the problem is exasercbated. Remote control signals are normally received during playback for interrupting the message being played or to request another message or give new gap insertion instructions, etc. The normal level of the received control signal will be about −25dbm. This, in the presence of a −15dbm speech leakage playback signal from the hybrid circuit 22 will completely prevent the control signal from being received since the talk off circuit will have adjusted to its apparent incoming level of −15dbm due to leakage. Only during relatively long gaps when the talk off circuit will respond to control signals is it possible to have a predictable response to the control signal. The only real opportunity for the receiver to respohd to control signals is during gap periods when the playback signal level is near 0. If the gap is long enough, the receiver will respond once the talk off circuit has restabilized and the automatic gain control circuit, normally incorporated as part of the receiver's function as an aid to the talk off protection, have restabilized to a low signal level. In order to assure that tone signal echos will not simulate a false signal indication, the automatic gain control circuit will have a relatively slow recovery rate and will require on the order of several hundred milliseconds to adjust to overall average changes in receive signal level. Thus, after the removal of a large signal at the receiver input due to the presence of a gap in the playback message, the gain will be increased slowly to insure that low level echo return signals will not be increased to a level which will appear as normal transmitted signals. Given the slow recovery rate of the automatic gain control circuit, the receiver will not respond to control signals during the gap time when the gaps are short and certainly not for all gaps where the usual gap length has been reduced to ½, ¼, etc. down to the minimum of approximately 20 milliseconds. When a user selects a recorded file in error and has previously removed or shortened the gaps, there will be no control of the system from the remote end until the entire recording has been played.

FIG. 2B graphically illustrates with dotted lines showing the output signal paths and relative levels, a situation in which the problem can occur. Input parallel tone control signals at −25dbm are being supplied through the hybrid circuit 22 to the parallel tone receiver 23. Meanwhile, playback speech at 0dbm incident output level leaks back at −15dbm to the parallel tone receiver 23. The AGC circuits will have corrected the input gain for signals having a level of −15db or higher. Thus, the incoming control signals at −25dbm will go unrecognized totally until a gap of sufficient duration exists and a sufficient additional time passes for the automatic gain control circuit to readjust to the new lower level that will permit control signals to pass.

Figure 3:
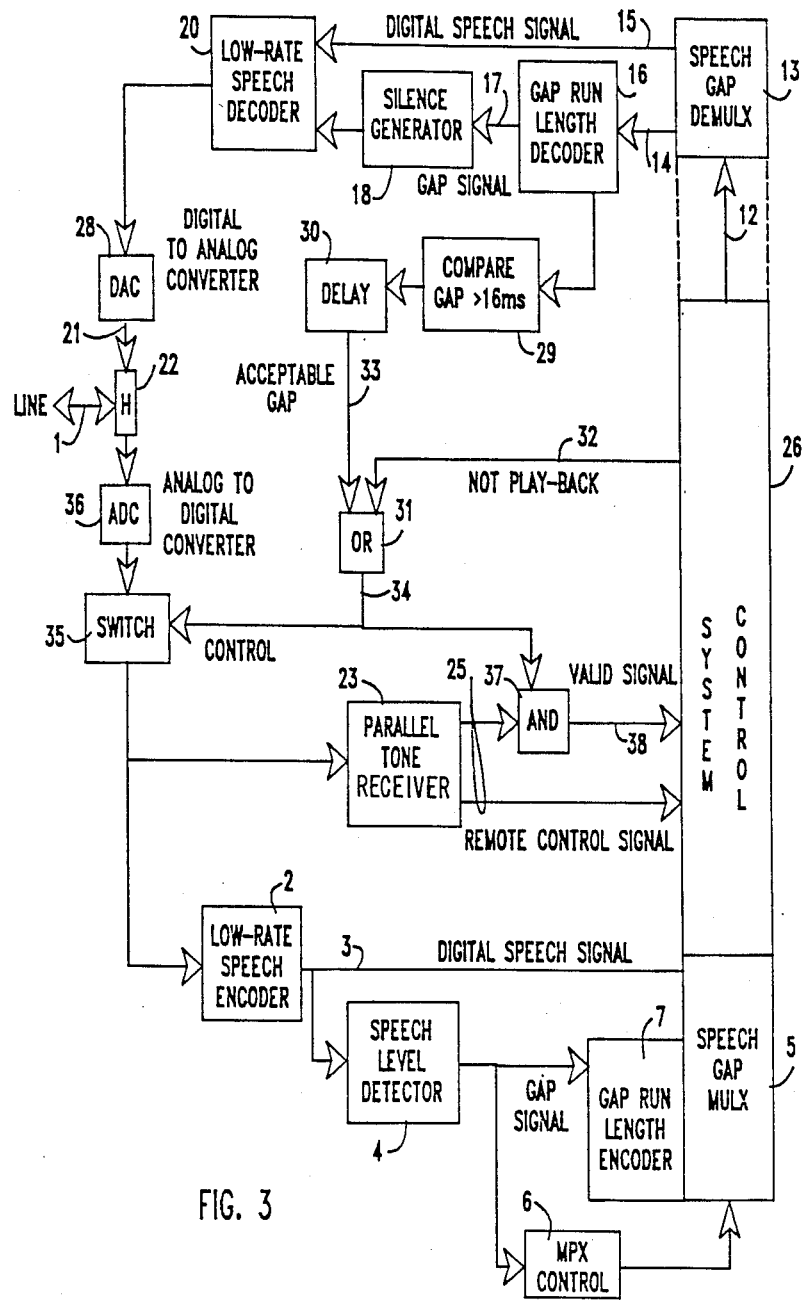
FIG. 3 illustrates a preferred embodiment of the present invention.

Turning to FIG. 3, a preferred embodiment of the present invention which solves the foregoing problem is shown. In FIG. 3, the improved control technique and apparatus for use in speech filing systems and the like, is described with an assumed basic vehicle in the form of a microprocessor operating with algorithms for all of the speech processing tasks of speech coding, decoding, parallel tone reception, audio level control, speech level detection and gap length coding. These are all done in a digital signal processor generically shown as the system control 26 in FIG. 3. Systems of this type are described in the IBM Series/1 Telephone Communication Attachment feature as shown in the IBM manuals GA34-0174-0 or SY34-0236-0 available from the International Business Machines Corporation through branch sales offices.

The analog interface in FIG. 3 consists of the standard analog to digital and digital to analog components commonly available in the industry. The interfaces provide an intermediate PCM coded signal typically at 64 kilobits per second rate.

In the present system as shown in FIG. 3, the parallel tone receiver is removed from the reception path connected to the hybrid circuit 22 by a switch 35 during an active playback mode of operation. This will remove relatively large amplitude speech leakage signals coming through the hybrid circuit that would normally enter the parallel tone receiver 23 and the low rate speech encoder 2. This will eliminate any possible false control activation on the receiver's side due to leakage from the playback material. More importantly, this also allows the automatic level control function, which is an integral part of the receiver to be at its quiescent level at a very low input. The switch 35 is controlled to allow normal reception during the recording and control mode and when playback mode is not activated.

In the present invention, advantage is taken of the known silence gap lengths that are interspersed with the digitally coded speech signal coming from the storage medium. These gaps are encoded as to length and can be played back in full or reduced to some proportionately smaller amount through the control signals produced by the user at a remote end. During playback, when a gap is detected as having sufficient length to allow the parallel tone receiver to respond to a potential control, signal from a remote user, the switch 35 will be closed to allow signals from the hybrid circuit 22 to again enter the parallel tone receiver 23. The threshold for what constitutes "suitable" gap length will vary according to the exact type of receiver and exact AGC algorithm employed. However, a 16 millisecond duration will be a minimum time with most practical receivers and is slightly less than the minimum practical gap time that results from the turnaround or hangover time of the speech level detector function. Of course, the control signal denoting the occurrence of a suitably sized gap must be delayed by an appropriate amount, typically 20 milliseconds for a 16 kilobit per second decoder, to account for the propagation delay through the speech decoder circuits so that the gap information will occur at the hybrid circuit in coincidence with the control signal.

Assuming a gap of acceptable duration is located during playback mode, the receiver AGC circuit will start from a low signal level state and thus will have sufficient gain attack rate to adjust rapidly to a potential remote signal level at −25dbm and allow successful reception. If the input has been subjected to the relatively high level leakage signal that would result from playback in the conventional configuration shown in FIGS. 1 and 2, the gain recovery rate of the receiver would not allow time for the receiver to adjust to the low level control signal unless the gap lasted for several hundred miliseconds. Signals during shorter gaps would have been ignored completely.

The relationship between gain attack and recovery rates for automatic gain control circuits has been exhaustively investigated by Hellwarth and Jones in an article entitled, "Automatic Conditioning of Speech Signals," appearing in the IEEE Transactions on Audio and Electro Acoustics, Vol. AU-16, Nov. 2, June, 1968, page 169 et seq. The concepts of automatic gain control attack and recovery rates implemented in digital techniques for automatic gain control are also described in U.S. Pat. No. 3,983,381 issued to the inventor Jones of the present invention, filed Dec. 18, 1974 and issued Sept. 28, 1976.

During the time that an acceptable gap in signal exists, the receiver can be operated in the same manner as in the record mode with signals from the hybrid circuit connected to the parallel tone receiver 23 and to the low rate speech encoder 2 in FIG. 3. A valid signal lead 38 which is common to all parallel tone receiver circuits and algorithms is Anded in And gate 37 with a gap signal from logic circuit 29, 30 and 31 as will be discussed briefly. When the gap duration ends, and active speech playback resumes, the receiver will be switched out of the reception path and And circuit 37 will insure that any transient responses due to propagation delays in the receiver are not falsely interpreted as a valid control signal. When valid control signals are detected during a gap period in the speech playback signal, the system control will stop the playback and open the receiver path to await full control information. A listener at a remote end normally attempting to gain attention during playback by pressing a designated stop key on his telephone key pad can thus gain control over the system without the inordinate delay of waiting for the several hundred millisecond gap or delay to occur.

In FIG. 3, during playback mode, the speech and gap demultiplexer 13 plays back the digitized speech and gap multiplexed codes, as is known. Digital speech signals are emitted on line 15 to the low rate speech decoder 20 which supplies its output to a digital to analog converter 28 for eventual application through hybrid circuit 22 to the telephone line 1. The detected gap run length codes are emitted on line 14 to the gap run length decoder 16 which will supply gap duration timings to the comparator circuit 29. If a gap duration of at least 16 miliseconds or more is detected, an output to the delay circuit 30 which has a delay long enough to allow for propagation of voice signals through the low rate speech decoder 20 and the digital to analog converter 28 will, in synchronism with the output from the digital to analog converter, produce an output on line 33 indicating that an acceptable gap length has been found. This signal on line 33 is applied to the Or gate 31. The other input to Or gate 31 is the not in playback mode signal line 32 provided by system control 26 when the record or control mode is present. Either condition will activate Or gate 31 to supply its output on line 34 controlling switch 35 and And gate 37. When an acceptable gap exists, the switch 35 will be reconnected to allow signals from the analog to digital converter 36 supplied with incoming signals from telephone line 1 through hybrid circuit 22 to exit into the parallel tone receiver 23 and to the low rate speech encoder 2 as in the conventional system such as that shown in FIGS. 1 and 2. The detection of a parallel tone control signal in the receiver 23 will generate an output on line 25 indicating that a remote control signal is present and the And gate 37 will validate this signal as a valid signal line 38 to indicate to the system control 26 that true incoming control signals are present.

The remainder of the system components that have not been specifically discussed are the same as those employed in FIGS. 2A and 2B or in FIGS. 1A and 1B and have been similarly numbered and need no further description for those of skill in the art.

It will be readily apparent to those of skill in the art that numerous applications for the improved parallel tone control method and apparatus of the present invention exist and that many departures in the specific embodiments contemplated may be made without departing from the spirit and scope of the invention. Therefore, what is claimed and which is desired to be protected by Letters Patent is given by way of description and not of limitation.

What is claimed is:

1. An improved method of controlling a digitized analog recording and playback signal system having locally recorded and played back playback signals and remotely entered control signals and a tone controlled receiver comprising steps of:
   identifying a gap in said playback signal of duration at least equal to that necessary for reception of a valid control signal; and
   enabling a gating means in response to said identifying step for connecting a signal input path to a tone controlled receiver for detection of control tones; and
   disenabling said gating means during playback and during times when gaps of duration less than that necesarry for reception of a valid control tone exist.

2. A method as described in claim 1 and further comprising said step of comparing the gap in the playback signal against a reference time equal to the minimum acceptable period in which a control tone may be recognized and acted upon.

3. A method as described in claim 2 and further comprising a step of:
   delaying the output from a successful comparison in said comparing step for a time period equal to the delay in the output path of the playback circuitry.

4. A method as described in claims 1 or 2 or 3, further including a step of:
   generating a valid control signal indication in response to the indication of said duration gap detection occuring contemporaneously with the receipt of a parallel tone control signal.

5. Apparatus for controlling a digitized analog speech and signal recording and playback system having a speech signal gap run length decoder means connected to the output of an analog speech signal and gap demultiplexer and further having a parallel tone receiver circuit and comprising:
   comparison means connected to said gap run length decoder means and provided with a gap length indication from said decoder means for comparing said gap length against a reference time standard; and
   gating means connected to said comparison means and responsive to a true comparison for gating incoming analog 14 signals to the parallel tone receiver circuit for recognition of control signals.

6. Apparatus as described in claim 5 and further comprising:

means connected to said gating means for controlling passage of incoming signals to said parallel tone receiver and permitting said passage when the system is not in playback mode.

7. Apparatus as described in claim 5 or 6, wherein: said apparatus further includes control signal validating means for generating a valid signal indication when received parallel tones exist in concurrence with speech gap durations having a true comparison to said reference in said comparing means.

* * * * *